United States Patent [19]

Dolch

[11] 3,868,634

[45] Feb. 25, 1975

[54] READING OF CONTRASTING DATA BY MEANS OF CONTINUOUSLY ATTEMPTING TO DECODE READ SIGNALS

[75] Inventor: Volker Dolch, Neu Isenburg, Germany

[73] Assignee: Scanner, Inc., Houston, Tex.

[22] Filed: Nov. 3, 1972

[21] Appl. No.: 303,507

[52] U.S. Cl. .................. 340/146.3 D, 235/61.11 E, 340/146.3 K, 340/146.3 AH

[51] Int. Cl. .............................................. G06k 7/10

[58] Field of Search ............. 340/146.3 K, 146.3 Z, 340/146.3 AH, 146.3 D, 146.3 H, 146.3 ED; 235/61.11

[56] References Cited

UNITED STATES PATENTS

| | | | |
|---|---|---|---|
| 3,277,283 | 10/1966 | Rabinow | 340/146.3 K |
| 3,381,274 | 4/1968 | Quade | 340/146.3 D |
| 3,543,007 | 11/1970 | Brinker | 340/146.3 K |
| 3,674,990 | 7/1972 | Kurauchi | 340/146.3 K |
| 3,676,645 | 7/1972 | Fickenscher | 340/146.3 Z |

*Primary Examiner*—Gareth D. Shaw
*Assistant Examiner*—Robert F. Gnuse
*Attorney, Agent, or Firm*—Ralf H. Siegemund

[57] ABSTRACT

Randomly positioned and oriented data fields are read against random contrasts backgrounds through step-wise rotating scanning rasters and by continuously attempting to decode signal trains on basis of encoding formats for plural characters; multiple criteria are used to reduce probability of recognizing random patterns as data.

15 Claims, 5 Drawing Figures

READING OF CONTRASTING DATA BY MEANS OF CONTINUOUSLY ATTEMPTING TO DECODE READ SIGNALS

BACKGROUND OF THE INVENTION

The present invention relates to method and apparatus for identifying objects which may at times appear in a particular location and whenever the need for identification arises. More particularly, the invention relates to method and apparatus for preparing objects for quantitative identification and for providing for acquisition of such identification.

Objects such as items of merchandise, warehouse components or the like may have to be identified at times in machine readable form. For this, machine readable code patterns are affixed or otherwise applied to these objects whereby the code pattern identifies the objects to the extent needed. Such identification may include one or more data items such as part number, quality codes, dimensional identification, relevant dates, price, number of items in a box, etc. This identifying data is placed on the surface of the objects in some form or another.

Acquisition of such data is rarely possible under complete exclusion of disturbing influences. Rather, in the general sense, the objects differ in size, dimension and, most importantly, the identifying data is not regularly placed thereon. The acquisition process cannot be carried out under the assumption that the data be presented in a definite location with definite orientation and at specified times. In other words, a contemplated acquisition process is unlike punch card reading where a card is placed in a well-defined reading position with edges abutting guide rails, etc., and where the completion of placement is well-defined in time. Quite the opposite is true for the general case of data acquisition presently considered.

The data identifying an object are contained in a field which may have been placed somewhere on an object and the object itself may appear more or less approximately in a definite location which, for practical purposes, is a random location, even though there may be practical confines. Also, the angular orientation of the data field must be regarded as being at random; so must be the time of appearance.

Take the situation of an automated supermarket check-out facility, the identifying information being price. The objects are various items of merchandise, such as boxes of numerous shapes, sizes, bottles, packages, etc. These items appear one after the other in a check-out counter wherein the prices have to be read and tallyed. The one constraint that can reasonably be made is that the respective suruface of any item bearing the identifying information must face always in one particular direction, for example, up or down or sideways. Consistency can readily be observed up to this point. It is impossible, however, to require that orientation and location of data fields bearing the price information be predetermined through precise positioning of the items. Moreover, labels holding the data field must be expected to have been affixed to the different items in various orientations. Also, the items will not pass through the check-out counter in regularly spaced apart relation, nor will they appear in regular sequence in the reading station.

As a consequence of these various uncertainties, the reading station must be in continuous preparedness for reading data, must look for the data and must read them in proper orientation. proposals have been made to identify items by providing data fields containing contrasting markings which are digital representations of the desired identification for such an item. In addition, the data field as such as identified by a particular unique marking having such characteristics so that upon scanning the particular area in which the object and its data field may appear, it can be expected that a unique signal pattern be provided when the scanning process passes across this identifying marking, possibly repeatedly and in particular timed relation as to sequential passes. This way, it is determined whether or not a data field, i.e., a label containing valid data, is actually within the particular area under surveilance. The detection of the presence and, possibly, of the orientation of the data field precedes the readout process proper. The readout process proper is then confined in one way or another to a scanning process covering the data field only.

Apparatus and methods of this type have been practiced successfully. Apparatus of this type is particularly fast, if the presence and orientation of a data field can be ascertained, for example, with only two differently oriented scanning rasters, searching the area in which a data field may appear. All these known methods have the specific characteristics that the label itself requires data field identifying markings of suffficient uniqueness and which are not data. Such markings occupy a relatively large amount of space if the degree of uniqueness required is such that the scanning process thereacross will result in a signal pattern which is extremely unlikely to be produced on basis of random information and random contrast patterns as they may appear in the area under surveilance. A fluorescent label does not require special marking because its edge is a distinguishing characteristic. However, printing on fluorescent labels was found to be expensive. Also, abrasion may result in loss of data on such a label.

DESCRIPTION OF THE INVENTION

It is an object of the present invention to provide for the acquisition of identifying information and data that may appear at random times and random location and orientation within a specified area, whereby the data field or the label, etc., bearing such information, is not particularly identified as such but whereby, however, the data itself has unique characteristics. In accordance with the preferred embodiment of the present invention, it is suggested to provide to such an object to be identified, prior to the need for such identification and its appearing in a particular area, a data field comprised of contrasting lines or bars for defining an identifying code for the object. The bar pattern has characteristics (*a*) establishing plural individual items of alpha/-numerical information, and characteristics (*b*) for the format of each such item; characteristics (*c*) for identifying the items in relation to each other and/or characteristics (*d*) for identifying the plural items as a whole. It is further suggested to scan the particular area by line raster scanning on a continuous basis including stepwise changing the direction of the lines of the raster so that the area is repeatedly scanned by line rasters of different orientation. The scanning is to include the providing of output signals representative of contrast as picked up during raster scanning of the particular area. The signals, thus, picked up are continuously processed, including detecting particularly recurring characteristics in the signal corresponding to a continuous and continuously progressing portion of and in a scanning line, usually smaller than the entire line, and determining whether the signal trace over that portion defines valid information on basis of at least one of said characteristics (*b*), (*c*) and (*d*). Subsequently, the object is identified on basis of the detected valid information as included in the characteristics (*a*).

By way of example, the characteristics (*a*) may be a particular bar code such as a "four-out-of-seven" bar code. The characteristics (*b*) will then be defined by the appearance of four bars within a span of seven positions (frame) for such bar for each character, and/or that a bar is always in one end position for a character, while no bar is placed on the other end. The characteristics (*c*) is or could be that exactly after seven positions after a character has been detected another character is being detected, and/or that plural such bar code characters follow each other in regular sequence and/or, that a particular start code character precedes the data proper. The characteristic (*d*) is, or could be the number of characteristics so detected as being fixed or that there are at least so many characters and/or that a character field is preceded and succeeded by specific bar code characters.

The invention, therefore, is predicated on the assumption that a data field is established by plural bar code characters or the like, wherein contrasting bars are placed parallel to each other and in spaced-apart relation along a direction, so that at one time or another a (or several) scanning lines of a raster will traverse the data field in or near that direction. The video output of the scanning process is checked in that continuously an attempt is made to decode the contrast pattern on basis of the encoding criteria as well as the criteria of placing the bar code characters next to each other. If plural successful decodings have been made, the data field is deemed detected.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a representative example for a bar code pattern that can be used for encoding numbers (permitting expansion to a complete alpha numerical code);

FIG. 1*a* is a representative example of a data field and label to be affixed to an item for identifying the item;

FIG. 2 shows a portion of a data field in alignment with signals extracted therefrom during reading;

FIG. 3 illustrates somewhat schematically a block diagram of an example of the preferred embodiment of the present invention; and FIG. 4 illustrates schematically conditions for the scanning process.

DESCRIPTION OF THE DRAWINGS

Proceeding now to the detailed description of the drawings.

The first column in the table identifies the ten decimal digits to be encoded, and two characters (arbitrarily) denoted X and Y are used to be placed at the beginning and the end of a data field respectively. The second column shows the bar codes and the third column defines the bar code as a binary type number with seven positions per character. An eighth bit would also be zero. One can readily see that each character has a bar in the first position. Strictly speaking, the bar in position one and the absence of a bar in position eight does not contribute to the code as such, but aids in the detection of validity of the information. In other words, for decoding proper, only six bits need to be decoded. For character recognition at large, eight bits should be considered with the 1 – 0 condition as to beginning and end. Also, the fact that each character boundary is definitely as contrast line (a marker bar on one side, none on the other) aids in a self-clocking procedure for digitizing read signals that result from scanning across the bar patterns.

Figure 1:
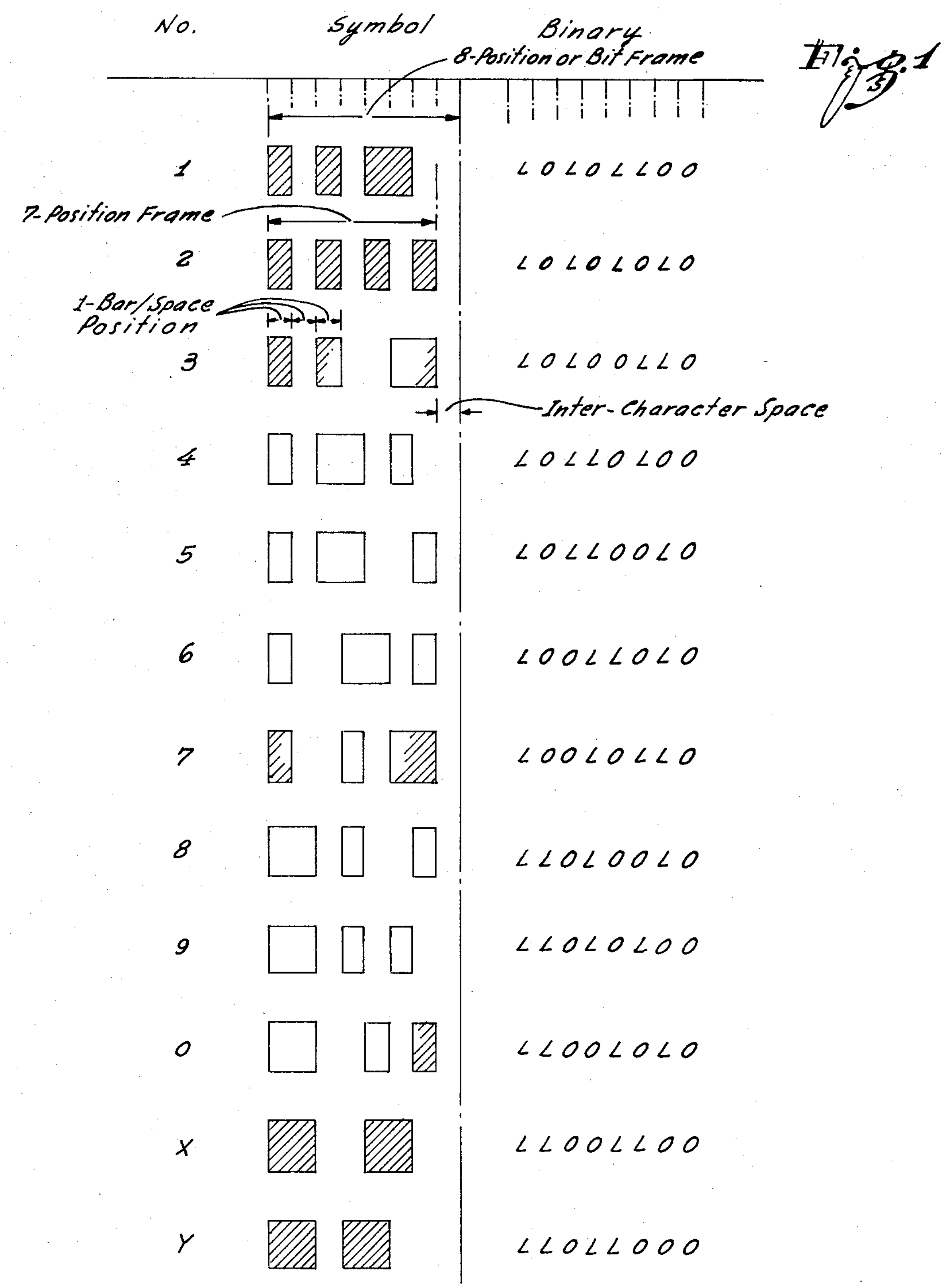
FIG. 1 illustrates by way of example a single channel bar code which can be described as a four-out-of-seven code, because four (not more, not less) bars are placed into seven different bar/space positions. Bars in adjacent positions merge. For reasons below, only two bars may be permitted to merge. Also, there are only one or two empty positions between any two bars. The code, however, could also be described as a three-out-of-six-plus-start-bar code or as a four-out-of-eight-code.
Figure 1A:
Figure 2:
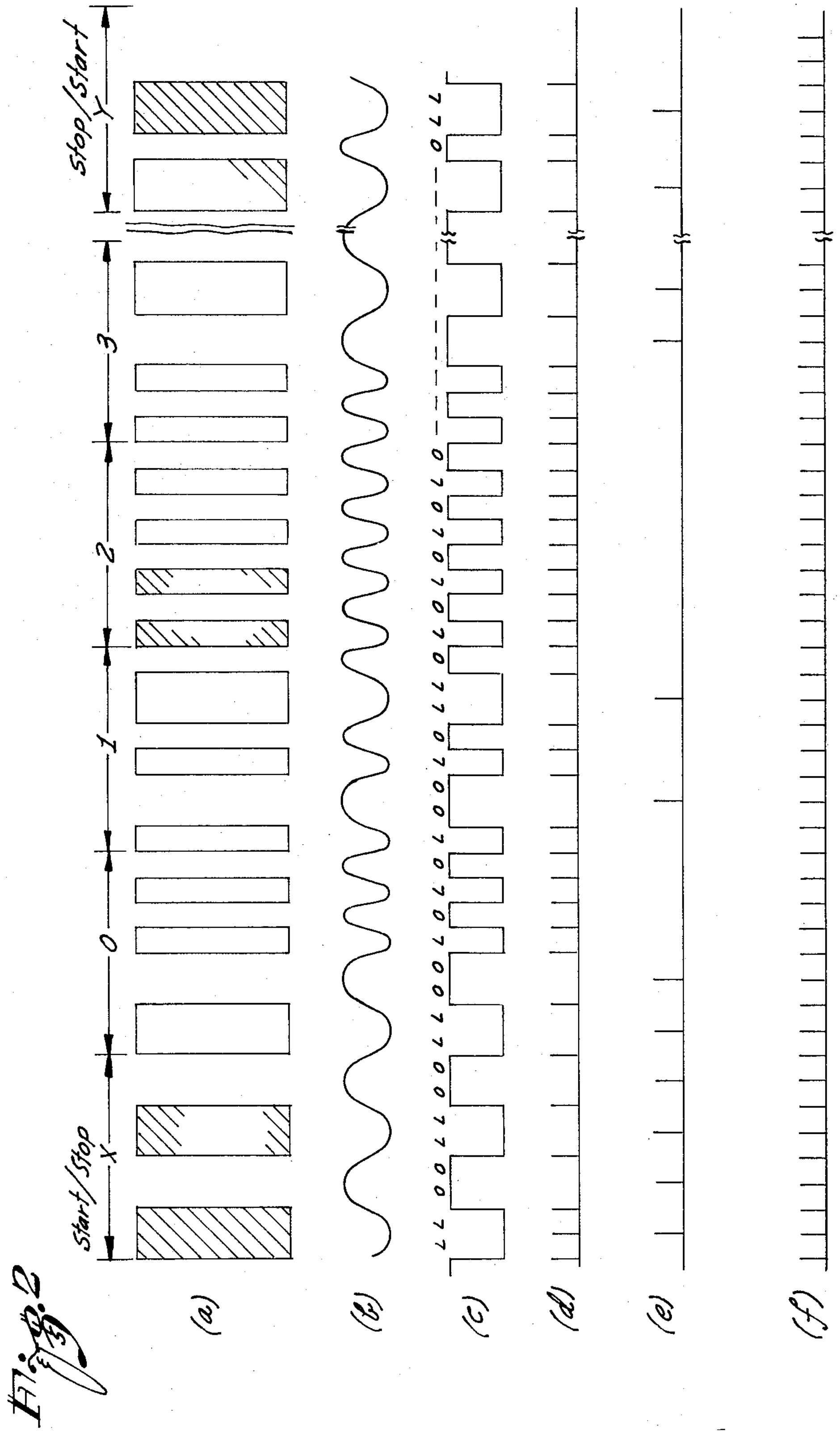

FIG. 1a is an example of the true configuration of a data field showing legible digits underneath the bar patterns. FIG. 2a illustrates somewhat longitudinally distorted, a representative example for a data field for better illustrating read and processing signals resulting therefrom. The data field is composed of start/stop character X, stop/start character Y and several numerical characters. One can readily see that a data field is characterized by numerous criteria which identify this particular pattern of spaced-apart black bars as a data field. Many, most or even all of the criteria should be used to identify the bar pattern as a data field.

For example, the bars come only in two widths, so do the spacings between them. Each character has either four narrow bars, one wide and two narrow bars or two wide bars. The data proper is preceded by a specific start/stop character and succeeded by a stop/start character. Conceivably, the number of characters in the field may be constant, so that the number of bars (counting wide bars as two narrow ones) is constant. Upon read-back by a scanning process, a new legal character must be present after eight space/bar positions (and correspondingly eight clock pulses) following detection of the first or a legal character, and that must be repeated for several eight-clock pulse groups in a row. If the number of characters is not fixed, the number of detected bars must be divisible by "four." The analogous tests can be performed as to empty bar positions, on the basis that these are three plus one intercharacter space.

The principle behind the invention is, as stated, to provide surveillance of an area by raster scanning, and by attempting to decipher the picked-up contrast patterns, whether or not they could represent legal data. Thus, signal trains representing variable contrasts in the search field under surveillance are scrutinized as to whether they can be decoded. Of course, this search field will have numerous isolated contrast patterns of any of the type shown in column 2 of FIG. 1. In other words, when a search field is scanned, the video signal will show, for example on numerous occasions, a contrast pattern which, when digitized, produces a pulse train 0L0L0LL00 (as is to be expected for a true "one"). However, the fact that such a pulse pattern occurs and can be decoded is per se quite inconclusive as to the question whether or not a data field has been detected. The criteria developed above requires particular spatial interrelationship of contrast bars producing particular pulse patterns and all these criteria have to do with the detection of legal characters in immediate or particular sequence. The probability that an extensive bar pattern is encountered which is not a data field, but meets many, most or all of the specified criteria, is the lower the more stringent the requirements are. Clearly, long data fields are less likely to be simulated by random contrast patterns than short ones.

Contrast patterns resembling any one character are undoubtedly encountered on numerous occasions during video scanning a field under surveillance. Two "characters" in a row may still occur quite frequently; three is already quite rare, a fixed number such as 10 is extremely unlikely; any number of legal characters bounded by two particular X, Y characters will occur quite rarely accidentally; a fixed number of legal characters between such X and Y characters is again extremely unlikely to be simulated by random contrast patterns. Thus, the overall criterium of recognizing a data field is based on probability, if the data is sufficiently extensive the probability of recognizing a random pattern as data is extremely remote. This, then, leads to other, additional considerations.

For example, the probability of interpreting as data a random pattern that is not data, may be already $10^{-10}$, it makes little sense to "improve" the situation by making the requirement still more stringent, so that the probability drops to $10^{-12}$. On the other hand, a certain relaxing of the requirements, which theoretically constitutes a deterioration, may have no practical significance on that account, but offers other advantages. For example, a label may be dirty or there may be a misprint. Therefore, a true character may not be decipherable any more, and upon reading the label, the bar code may not lead to a valid four-out-of-seven character. If the data field validating process is based, for example, on a fixed number of legal characters, not more not less, the information will be discarded, if that number cannot be found. However, such a procedure is not necessarily desirable. It may well be of interest to determine that a data field has actually been read, even though not all information so ascertained is correct. Therefore, one must try to establish a proper balance between how much faulty information is permitted and when is information to be regarded as too faulty. The probability that a signal pattern is actually not a data field, does not have to be excessively low before recognizing and admitting it as a legal data field.

Considering the foregoing, the rule as to a fixed number of characters in a row may be too stringent; a minimum number of characters within a certain space may be a more viable rule. This is particularly so as fixed length data fields may prove too cumbersome in cases. Detection of both, X and Y characters, may also be mandatory. Detection of a, possibly, interrupted string of characters of a minimum total length with at least one character X and/or Y on one end may well be a sufficient safeguard. However, special precautions may be needed here to safeguard against reading a data field for a scanning line having an angle that is to steep so that the scanning line does not cross all characters, just enough to meet the minimum requirement. Thus, incomplete data fields should be attempted to be re-read under slightly differing conditions.

Figure 3:
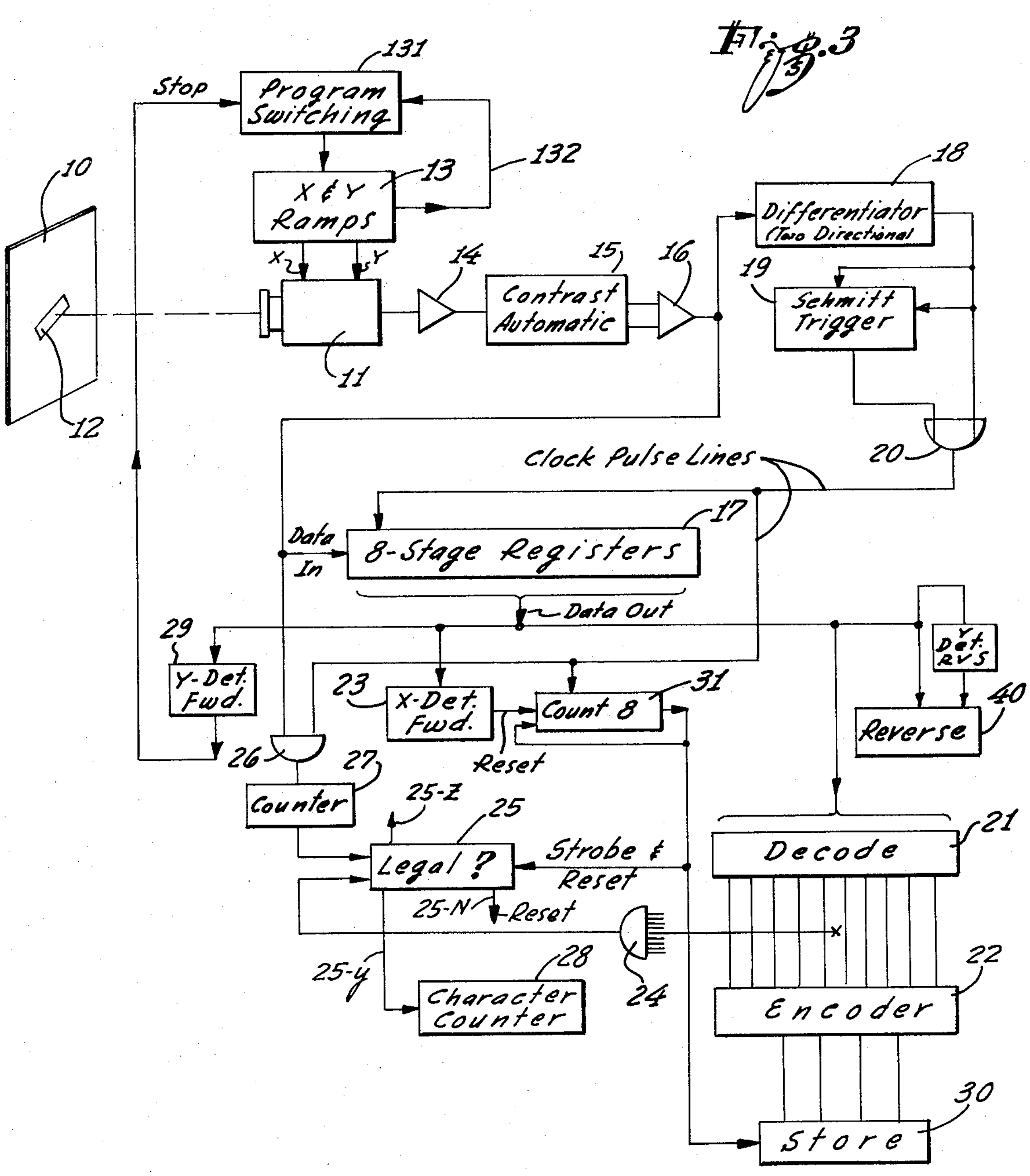

FIG. 3 illustrates a particular area 10 under surveillance for operation of a vidicon camera 11. The area under surveillance is illustrated, and an item of merchandise with its label 12 affixed may at times appear within that area 10. However, the time of appearance of the label in area 10, and its orientation and position therein is completely unknown. Moreover, the area 10 is full of other contrasts, many of them resembling the contrast patterns of the bar code quite closely. The vidicon camera has a pair of *x–y* deflection systems, i.e., it is provided with means for deflecting the scanning beam therein in two orthogonal directions. These two directions are completely at random as far as the area under surveillance is concerned, in other words, the *x* and *y* coordinates of the camera as projected into the field have completely random orientation as far as any possible orientation of a data field and label is concerned as it may appear within that field.

The deflection circuit of the vidicon tube is under control of an *x–y* function generator 13 which produces a line scan raster of selectible directions. Circuits suitable for that purpose are, for example, disclosed in my copending application Ser. No. 284,733, filed on Aug. 30, 1972. That circuit can be supplemented by additional "weighted" resistors to obtain additional angles of raster orientation.

Briefly, the function generator produces signals $a \cdot t$ and $b \cdot t$, respectively, for the X and Y deflection circuits, wherein $t$ is time and $a/b$ is the cotangent function of an angle relative to the X axis, so that the scanning spot is deflected along a line having angle $\alpha$ to the X axis. After a predetermined time or after a predetermined deflection length, the ramps are reset to zero so that a particular scanning line is run through repeatedly. Concurrently, the X and Y deflection circuits receive signals $c \cdot t$ and $d \cdot t$, respectively, wherein $c/d$ is the tangent of angle $\alpha$. If the relative speeds of deflection $a/c$ or $b/d$ differ, one obtains a scanning raster field oriented by angle relative to the X axis as to the scanning lines.

Upon changing the angle after each completed field scan, the search field is scanned repeatedly at different angles. The proportionality factor $a$, for example, is equal to the desired scanning speed for a line multiplied by the cosine of the current raster angle to the X-axis. Upon varying the latter proportionality factor and upon correspondingly varying the factors $b$, $c$ and $d$, different angles are obtained. The variations can be carried, for example, through gain control or through selection of signal levels applied to integrating operational amplifiers when used as ramp generators.

Figure 4:
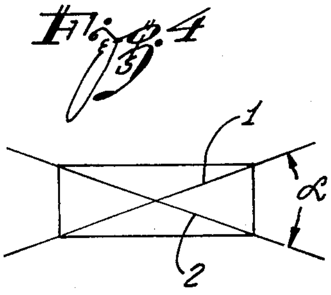

The angles are to be varied in steps. These steps depend on the dimensions of the data field. The purpose of the change is to attempt to obtain a raster orientation in which at least one scanning line passes across all bars. FIG. 4 illustrates this requirement by way of example. The label illustrated is about 8 millimeters high and 43 millimeters long. It accommodates eleven characters. Lines 1 and 2 are two scanning lines having angle of ± 12° relative to the long side of the label and are just about capable of traversing all markings. Lines 1 and 2 run about along the diagonals of the label. Thus, the angle of raster scan should vary in steps not greater than 24°. The angle in-between different scanning raster should be smaller than 24°, if the spacing from line to line is larger than the width of a line.

One can see here a balance as to speed. A scanning raster with rather widely spaced lines is run through faster than a raster with narrower spaced lines. Thus, there is a choice of using a raster with widely spaced lines and changing the angle between different rasters in small steps, or one uses a raster with closely spaced lines and changing the raster orientation in larger angle step. The situation is different for different label sizes. Clearly, the higher the data field the better. Particularly the height of the bars should be made as large as possible.

Returning now to FIG. 3, it can, thus, be seen that the vidicon tube is operated to scan the area 10 repeatedly by differently oriented scanning rasters. When we speak here of a stepwise change in orientation, this does not mean that two raster fields which follow each other immediately, do, in fact, have orientations that differ by that angle. In other words, there is no inherent need to change the orientation in steps progressing in an ascending or descending order. It may be advisable, for example, to change the orientation first by angles of 20° from 0°, 20° etc. to 160° and then to go from 170°, 10°, 30° etc. In view of the fact that the data code used is preferably selected to permit forward and reverse scanning, a multiple raster scan has been completed by covering the angle range from 0° to 180° in the chosen steps. It is important that in each program switching cycle all possible orientations be investigated. The particular sequence is not important.

Circuit 131 denotes a program switch which changes the ramp generators and/or their outputs in preselected steps, whereby the flyback signal of the flow field ramps (connection 132) is used to trigger the program switching circuit after completion of scanning a raster field. In the most simple form, circuit 131 can be designed as a simple step switch; in each program state it causes particular switching states in circuit 13 corresponding to the desired production of ramp signals. A flyback signal in line 132 advances the switch to the next state.

During raster scanning, vidicon camera 11 provides continuously a video output signal which is fed to a video amplifier 14. Upon passing across a data field, such as shown in FIG. 2*a*, a video signal as plotted in FIG. 2*b* will be produced. That video signal is processed in a contrast automatic circuit 15 which in effect quantizes the information. A contrast automatic suitable for that purpose is disclosed, for example, in my copending application Ser. No. 299,060, filed on Oct. 19, 1972. The contrast automoatic has an output comparator 16 which is shown specifically in FIG. 3 of this application, and which provides a train of pulses (FIG. 2*c*), representative of the passage of the scanning beam across contrasting markings.

As a consequence, the circuit will produce a train of pulses which, broadly speaking, can be regarded as a particular way of discriminating between lighter and darker contrasts in the area under surveillance. This train of pulses is fed to a register 17 which is of the shift register type and receives the train of pulses which are passed through by means of shift register docking. The register could be clocked, for example, by means of a fixed clock, running at a frequency which has a fixed relation to the passage rate of video signal drops and rises upon scanning across the bars and spaces of a data field. Under such circumstances, all video signals would pass in digitized configuration through the register even when there is no data field. However, the clock employed is somewhat different and derives clocking signals from the video signals itself. To some extent, this aspect serves already as a rejection of unwanted "data."

Looking again at the date format of FIGS. 1 and 2*a*, one can see bars and spaces come in two widths. Therefore, a clock is generated from each leading edge and from each trailing edge of a pulse as furnished by comparator 16 (FIG. 2*d*). Additionally, an artificial pulse is produced for each edge pulse, and slightly after a bar/space position length (in time) has elapsed, provided an edge pulse is not produced at about that time or shortly before (FIG. 2*e*). Thus, artificial pulses are not produced whenever the scanning spot passes across narrower bars and narrower spaces.

Whenever the scanning spot passes across a wide bar (two bars in the chosen space/bar position format) or across a wide space (two spaces), an artificial pulse is produced in about the middle of a leading and trailing edge pulses derived from that wide bar or that wide space. FIG. 2*f* shows the composite (or'*d*) clock pulse train that can be derived from edge and artificial pulses. It can, thus, be seen that an orderly train of regularly spaced clock pulses is produced only when contrast bar edges follow at one or two data bar/space position spacings apart, while longer spaces or longer dark fields will not produce clocks; except that on each contrast edge there will be a pulse, and about one bar/space thereafter there will be an artificial pulse. This way, the circuit will synchronize itself automatically to any data field and, its format.

Returning to FIG. 3, a differentiating circuit 18 responds to the leading and trailing edges of the pulses from comparator 16 and produces a train of spikes representative thereof (FIG. 2*d*). Each spike starts a trigger 19, i.e., the timing of trigger 18 begins to run, but each true edge spike resets the trigger also. Trigger 19 will produce a spike only if, for slightly longer than a small bar/space width a spike does not occur. Edge spikes from circuit 18 and trigger spikes are fed to an or-circuit 20 whose output is as shown in FIG. 2*f*.

The pulses from or-gate 20 are used as shift clocks for a shift register 17 with parallel read-out capabilities. These pulses clock the data train (FIG. 2*c*) into register 17 and shift them therethrough. The register 17 has eight stages (strictly speaking, six suffice) so as to hold in any instant eight bits, which at times will be the seven bar/space code bits plus a zero bit for the intercharacter space (or six code bits preceded by a "one" and succeeded by a "zero"). This bit assembly in register 17 is decoded in a decoder 21 and presented by the decoder in a one-out-of-ten code on ten output lines.

Each bit assembly and character as shown in the third column of FIG. 1, and as presented in a one-out-of-ten code by the decoder may, for example, be re-encoded into bcd format by encoder 22, and set into a register store 30, four bits per decoded and re-encoded character. These characters are sequentially accumulated in store 30. A counter 31 keeps track of the number of clock pulses produced, there should be eight for each character. The counter 31, thus, counts up to eight clock pulses and delivers a strobe pulse to the store 30, because during passage of the scanning beam across the data field there should be a new decoded and re-encoded character available after each group of eight clock pulses. Upon scanning across a true data field this will, in fact, be true.

This operation proceeds during each passage until the stop/start or Y-character code is detected by detector 29 upon occurrance of a strobe pulse from counter 31. (Strictly speaking, detector 29 may be a portion of decoder 21 providing an eleventh output accordingly). As detector 29 responds, the program switching device 131 is stopped and reset, to resume operation after a certain time has elapsed during which the object with the data field will be (or can be expected to be) replaced by another object. Specific criteria for the time of re-starting another program cycle may depend largely on the circumstances and environment of using this sytem. The content of store 30 may be pushed down or advanced, e.g., to further storage and processing. The remainder of the circuit will be reset.

Thus far, only the regular data reading has been described. It can readily be seen that without further measures, more or less randomly appearing bit patterns such as shown in FIG. 1 would be sequentially "decoded" and converted into bcd, and the latter characters would be accumulated in store 30. Moreover, without further measure, any random pattern appearing to be the start/stop character would cause strobing of the encoder output into store 30 after any eight clock pulses, even though there are no data to be strobed. Needless to say that scanning of about any field would rapidly cause accumulation of random data numbers in that fashion. Therefore, we proceed now to the stepwise exclusion of such random information.

Considering a scanning pass across the data field in forward direction (scanning line 3 in FIG. 3), the register 17 may hold already some "data," and some "data" may likewise be held in store 30. As the scanning beam traverses the eight bar/space positions holding start/-stop character X, eight clock pulses are produced, and the seven bits plus intercharacter space bit for this character are set into the eight stages of register 17. An X-decoder 23 responds and resets and clears various components, including store 30 as well as several counters such as 31, as well as a counter 28 and others to be introduced individually below. Thus, recognition of a data field requires (usually) the detection of this particular bit combination LLOOLLOO defining the start/stop character before other bit combinations can be recognized as data.

Of course, such bit combinations originating from contrasts other than the X-character will appear during scanning, possibly on numerous occasions, so that this initial set-up is not at all conclusive on the point that what follows is data. However, the start/stop character in a true data field is immediately succeeded by another character having a bar in the first bit or bar/space position, and after seven clock pulses there should be a space. The counter 31 (which was reset on X-character recognition) counts up to eight clock pulses duly produced by circuit 18-19-20, and with the last clock pulse, preferably slightly delayed to allow for settling, the result of the re-encoder 22 is strobed into store 30. At that instant, the decoder should, in fact, present a legal character, i.e., one of the one-out-of-ten output lines of decoder 21 should hold a signal.

A NAND-gate 24 connects to all ten lines and the output thereof will go up if all inputs are false. This will indicate that a legal character is not held in register 17. Reference numeral 25 denotes generally a unit testing legality of characters. It responds to strobe pulses from counter 31 which are indicative in time when a legal character is or should be present in register 17. If a legal character is not present, e.g., eight clock pulses after a start/stop was recognized, such an indication may be used right then and there to stop the decoding process. All registers and counters are reset and the system resumes searching for another X-character. The program switching circuit 131 is not affected at all and raster scanning production, completion and rotation is just continued regularly. However, if we allow one or a few characters in a true data field to be faulty, then the decode process should not be interrupted. If we allow, for example, two characters to be wrong, then a "faulty character counter" in circuit 25 should be advanced, and the reset signal should not yet be produced.

The decoder 21 may have only six lines as input from register 17, because only six are needed for decoding proper. Two output lines should lead from the first and last stage of register 17 to legality testing unit 25, and the strobe signal from counter 31 as well as the "any character" signal from gate 24 should coincide with a (1,0) combination in these stages, to further reduce probability of character simulation by random contrast.

Additionally, or in the alternative to the "any character" signal from gate 24, the number of bars (counting a wide one as two) may be checked. A gate 26 connects to comparator 16 as well as to clock gate 20 and drives a counter 27. If the counter is in count state "4" at the time of the strobe pulse, the character code held in register 17 meets the format requirement. If the counter 27 is not in count state "4" at the time of the strobe pulse, a parity error is indicated and treated in circuit 25 analogously (but not cumulatively as to a, possibly, concurring error indication from circuit 21).

Circuit 25 is preferably designed to give off a signal (line 25-Y) whenever a strobe pulse occurs and an error indication is not signaled. Such signals (one per detected legal character) drives a counter 28. The counter 28 may be used to count a particular minimum number of detected legal characters (which may be less than the maximum or usual number of characters in a data field). That count number may be selected on basis of probability. It is already extremely unlikely that, for example, five legal characters are being detected shortly after the start/stop character has been detected and in synchronism with the recycling operation of counter 31, when, in fact, there is no data field being scanned across.

The operation may legally stop whenever a detector 29 responds specifically to the stop/start character. Allowing for the possibility that the stop/start character is obliterated, or for the possibility that the minimum number of characters was detected, but the scanning line was too steep, or too high or too low, and did not traverse the stop/start character, the read and decode process should not stop but continue, for example, until a certain number of faulty decodings have been registered by and in the faulty character count in unit 25. The resulting output (line 25-Z) should be used as reset signal in the circuit, just as the reset signal from line 25-N, except that the accumulated content of store 30 is not erased but pushed down as a possible, through incomplete read-out. The next scanning line may well traverse the full field. Alternatively, the next rotated raster field may produce a complete reading. In each of these cases the previously accumulated characters in store 30 is erased. It may be, however, advisable to accumulate all incomplete readings that resulted in a minimum number of characters so that in case of obliterated characters, including obliteration of the stop/start character, several, possibly different, incomplete readings are available and that may prove to be valuable information as such.

In lieu of counting faulty characters, a signal may be given off by the counter 28 (analogous to 25-Z), for example, a delay period after it had counted the minimum number of required legal characters. In this case, a simple timing signal may suffice.

Allowing for a possible obliteration of the start/stop character (whose detection did set the various operations into motion), the situation can be dealt with in various ways. Actually, this aspect deals with the point that these X and Y markers at both ends of the data field are not essential. They are, however, very convenient indicators.

The counter 31 may not be a recycling counter but overflows on the ninth clock pulse. The circuitry could operate to use the "any character" signal from decoder 21 and gate 24 as trigger and set-up signal for resetting counter 31. A first true character beginning with a (or two) bars as per code and preceded by at least two "spaces" is likely to find the clock pulse counter 31 in overflow, if the condition is realized that counter 31 is kept in overflow condition as long as the "any character" signal is not produced. Proper orperation here requires the minimum number of proper characters to occur in a row. As counter 31 resets only on "any character" and does not recycle. Actually, the "any character" signal may be produced quite frequently by random contrasts, but much more frequently is that other contrasts in the video signal produce clock pulses and drive the counter to the overflow state. Therefore, a first character which is duly decoded and the "any character" signal resets counter 31, whereupon the sequentially appearing character codes will be duly decoded, stored, checked etc.

It can, thus, be seen that by operation of the circuit a progressively shifted portion of a scanning line is continually under surveillance. This portion encompasses at first a scanning line portion having length about equal to eight space/bar positions. This is so because several decoders are coupled in parallel to register 17, holding the contrast content of a variable length (variable because of the clocking scheme) line portion. That portion under decode surveillance is immediately expanded to an integral multiple of eight space/bar positions once the start/stop character (or *a* character) has been detected. This is the result of the operation, for example, of the counter 28, which counts the number of successful character code decodings, preceded and succeeded, for example, by decoding special characters. This way, the probability of an encounter with a random contrast pattern not being data is increased with each successful decoding step; until a reasonable cut-off point is reached from which on the decoded information is treated as true data.

The principle of operation, therefore, is such that the inspection field 10 is continuously placed under surveillance and the resulting video signal is processed in such a manner that a particular pulse train resulting from scanning progressive portions along a scanning line within the search and scanning field is continuously checked whether or not it contains valid information under specified criteria. Whenever these criteria are fulfilled, a data field is regarded as having been detected, and immediately then specific numerical information is available as resutling from sequential decoding and testing of pulse pattern. The result was accumulated in store 30 and plural successful accumulations serve as criterium for data field detection.

The philosophy behind this is, therefore, that it is extremely unlikely that random contrast pattern will at any instant fulfill the specific test criteria. In order to refine the system, it can readily be seen that in case valid data or presumably valid data have been acquired in this manner, the read process may be repeated, for example, by requiring that the read process be repeated on two sequential scanning lines within the same raster field, if the tolerances permit such redundancy as discussed above. The data field has a certain length and a certain width. The scanning beam and the scanning spot has considerably smaller dimension; therefore, the same label in the same data field can actually be scanned by slightly differing the scanning field as far as rotation is concerned and as far as individual lines are concerned. Utilizing this aspect, i.e., taking advantage of the definite, finite, geometric dimensions of the data field, organized redundancy can be obtained, and if such organized redundancy provides at least in a plurality of cases the same read-out of data, a data field is, in fact, regarded as having been detected and its content as having been read.

Another way of checking on the correctness of data on basis of redundancy is to turn the scanning raster by 180°. In essence, this can be carried out by switching inverters into the ramp generators of circuit 13 so that the X and Y deflection circuits receive oppositely oriented deflection signals. Reverse reading under redundancy conditions actually leads to the general provision that the data field can be read forward or backward. This capability is indicated by circuit 30 which is the symmetrical duplicate of the decode circuit as described thus far and as driven by the clock and connected to register 17. Briefly, there is a detector for the stop/start but responding to the reverse bit assembly for providing the start signal in the reverse reading case in response to the Y code read backwards. Counter 31 may be the same as in the forward case, as the clocking scheme works in both directions, and the legality tester 25, counter 27, control gate 26 and character counter 28 may also be the same and can be shared. The decoder 21 cannot be shared, but one-out-of-ten-to-bcd encoder 22 can again be shared.

Upon looking at the code table FIG. 1, one can see that the Y-stop/start character when read from right to left (deemed the reverse direction) requires three zeros before the first 1. Two zeros are automatically in the register resulting from the trailing edge of any contrasting marker that was in the path of the scanning spot before the latter hit this stop/start character. The Y-reverse decoder will, therefore, use only seven outputs from register 17, disregarding the stage farthest in the register.

It can readily be seen that the invention was described on basis of a particular code pattern, but is not restricted to that particular code. The principle of the invention does not depend on elaborate unique characters per se, but takes well into account that simple character codes per se resemble random contrasts when scanned. The principle of the invention depends on the fact that it is very unlikely that a random contrast pattern can be successfully interpreted as a particularly spaced series of encoded characters. The successful decoding of such a series is, thus, used as criterium that, in fact, a data field has been detected. In the prior art methods, particularly identified data fields are usually searched for and detected first on basis of field identifying criteria, and the data field is read thereafter as to its information content. In the present method everything within reach is read first, and when the reading "makes sense," only then is a data field deemed detected.

The invention is not limited to the embodiments described above but all changes and modifications thereof not constituting departures from the spirit and scope of the invention are intended to be included.

I claim:

1. The method of identifying objects which may appear in random position and random orientation and at random times in a particular area comprising the steps of:

providing to said object prior to said identification and appearing, a data field comprised of contrasting bars for defining an identifying code for the object, the bar pattern having particular characteristic (a) establishing a code for a plurality of individual items of alpha/numerical information, characteristic (b) for the format of each such item of alpha/numerical information in that each item of information has a particular total number of bars and spaced between bars and characteristic (c) for identifying the items in relation to each other and/or characteristic (d) for identifying the plurality of items as a whole;

scanning the particular area by line raster scanning equipment operating on a continuous basis, including stepwise changing the direction of the lines of the raster, so that said area is repeatedly scanned by line rasters of different orientation, the scanning including the providing of an electrical output signal representative of a contrast as picked up during the raster scanning of the particular area;

continuously electronically processing the electrical signal as provided including detecting particularly recurring characteristics in the signal corresponding to a continuous and continuously progressive portion of the scanning line including progressively deriving bits from the signal and assembling sequentially a fixed number of bits on the basis of characteristics (b) and (c) and attempting to decode the fixed number of assembled bits corresponding to characteristic (a), followed by assembling the same number of bits following said fixed first number of bits and attempting to decode the same number of bits, followed by at least one similar assembling and attempting decode step, for determining whether the signal trace over a scanning line portion smaller than the entire line defines valid information; and identifying the object by plural said items as detected on basis of detected valid information as included in characteristic (a).

2. The methods as in claim 1, wherein respective two raster fields differ as to orientation by an angle smaller than the angle between two diagonals of the data field.

3. The method as in claim 1, wherein the characteristics (b) is a fixed number of bars within a frame defined by a fixed number of possible positions for the bars, and characteristics (c) requires plural such fixed number of bars in a period of time corresponding to particularly succeeding frames.

4. The method as in claim 1, wherein the characteristics (b) is defined by a particular frame length for bars defining a character and characteristics (c) is defined by plural frames in immediate sequence.

5. The method as in claim 1, wherein the characteristics (c) is defined by particular combination of bars and spaces between the bars, at beginning or on end of the data field.

6. The method as in claim 1, wherein the characteristics (d) is defined by particular combinations of bars and spaces between the bars at beginning and end of the data field, different from the combination of bars and lines as between the particular combinations.

7. In an apparatus for detecting and reading information characters in printed form and having contrasting bars extending parallel to each other and along a data field and having means for scanning a particular area by a line scan raster, wherein the lines of the raster field extend in a particular direction on the area, and including means for developing a scanning information signal representing the contrast along the scanning line in any instant, further having means for changing the direction, so that the lines of sequential raster fields extend in different directions; and signal means connected to receive the signal and processing the signal to obtain a train of data bits; the improvement comprising:

a clock generator included in the signal means and producing a clock pulse for each contrast edge encountered, and another clock pulse a predetermined period thereafter equivalent to the width of a data bar, said clock pulses defining the bit rate in said train.

first means connected for processing the data bits of the train and searching for particular characteristics in the bit pattern of sequential groups of bits pertaining to one scanning line of any of the raster fields, each of the groups having predetermined length;

second means connected to the first means for decoding the groups of bits in accordance with a particular code conversion rule, and on basis of a plurality of particular patterns; and third means connected to the second means for assembling the converted codes of plural sequential successful decodings as a group of characters in a data field.

8. In an apparatus for detecting and reading information characters in printed form and assembled in a data field, each character having contrasting bars extending parallel to each other and along the data field, the apparatus having means for scanning a particular area in which a data field may appear, by a line scan raster, wherein the lines of the raster field extend in a particular direction in the area, and including means for developing a scanning information signal representing the contrast along the scanning line in any instant, further having means for changing the direction of scanning, so that the lines of sequential raster fields extend in different directions, and means connected to receive the signal and processing the signal to obtain a train of data bits; the improvement comprising:

first means for sequentially assembling n sequential bits of the train, where n is a positive integer, including means (a) for holding such bits and means (b) for shifting the bits of the train as produced through the means (a), so as to have n bits available at any instant in the means (a), for holding and following each shifting step;

second means connected to the first means and continuously attempting to decode n bits as assembled in the means (a) for holding the first means, and after each shifting step to provide representation of one of a plurality of characters, apparently represented by the bit pattern, then held in the means (a) for holding and when successfully decoded;

third means operating in response to a first successful decoding of a group of *n* bits in the first means and in further response to the subsequent passage of consecutive groups of n-bits each through the means (a) and to each successful additional decoding of such additional group by the second means and during the same scanning line, when respectively previously assembled and successfully decoded n bits have been shifted out of the first means, and signalling each said additional decodings; and fourth means connected to the second means for assembling sequentially decoded characters, including means for erasing any assembled characters upon failure of the third means to signal success of any of said additional decoding at an instant *n* new bits of another group have been shifted into the means (a) after the first decoding and having been attempted to be decoded, the second means subsequently continuing to attempt to decode *n* bits to search for another first succesful decoding; and means connected to the third means to be responsive to *m* - successful decodings of *n x m* sequential bits by the second means, wherein m is a positive integer, said assembled characters being erased by the fourth means upon failure of m-successful decodings.

9. In an apparatus for detecting and reading information characters presented in printed form and assembled in a data field the characters having contrasting bars extending parallel to each other and along the data field, the apparatus having means for scanning a particular area, in which a data field may appear, by a line scan raster, wherein the line of the raster field extend in a particular direction in the area, and including means for developing a scanning information signal representing the contrast along the scanning line in any instant, further having means for changing the direction, so that the line of sequential raster fields extend in different directions, and means connected to receive the signal and processing the signal to obtain a train of data bits, the improvement comprising:

first means for receiving the bits of the train and including register means for holding *n*-bits at a time, each bit entering the register means being shifted through the register means and discharged therefrom after having been placed into *n*-different sequential positions in the register means;

second means connected to the register means for attempting to decode and decoding the *n*-bits held therein in any instance and after each shifting by one bit position and providing a representation of successful decoding as distinguished from unsuccessful decoding of such *n* bits;

third means connected to the second means for being responsive to a first successful decoding by the second means and further responsive to the passage of plural consecutive groups of *n*-bits each and excluding but following the said successfully decoded *n* bits, for providing for a control for a decoding attempt by the second means, respectively each instance after *n*-sequential bits have passed through the register means following the first successful decoding and for *m*-times during the same scanning line wherein *m* is an integer larger than 1;

fourth means for assembling representtion of each said successful decodings; and means for erasing the content of the fourth means, following when said third means fail to provide said *m*-controls said first successful decoding and immediately an after unsuccessful decoding by the second means that occurred after less than $m + 1$ successful decoding attempts, and operating the third means to continue the search for another first, successful decoding attempt following the erasing.

10. In an apparatus as in claim 9, wherein means are provided to be responsive to a particular plurality of bits of a particular combination prior to a first response of the second means.

11. The method of identifying objects, which may appear in random position and random orientation and at random times in a particular area comprising the steps of:

providing to said object a data field, comprised of a plurality of contrasting bars spaced apart in a first direction and grouped in the first direction in sequential frames, so that for each sequential frame of predetermined length a particular combination of bars and spaced-inbetween bars is provided in representation of a character;

scanning the particular area in several differently oriented scanning rasters, so that said area is scanned by line rasters of different orientations, the scanning including the providing of an electrical output signal representative of a contrast as picked up during the raster scanning of the particular area;

detecting in the signal leading and trailing edges of the bars when scanned by any one line of any of the scanning rasters;

assembling representation of the leading and trailing edges as *n*-sequential bits, wherein *n* is a positibe integer;

continuously attempting to decode n such sequential bits as representing one of a plurality of characters, and anew for each new bit combination, as assembled each time a new bit is added;

attempting to decode m-times n-sequential bits, in *m*-attempts, *m* being a positive integer larger than one, and following a successful first decoding of *n*-bits, pursuant to said continuous attempting step, and providing a representation of each successful attempt and a separate representation for the first unsuccessful attempt following a successful attempt;

assembling sequentially a representation for each successful decoding attempt;

eliminating the assembled representations in response to said separate representation;

continuing to attempt to decode n-sequential bits in the case of said eliminating, while temporarily halting the decoding attempts, at the latest at the end of the scanning raster during which successful decodings occurred; and continuing the scanning without interruption as long as a particular plurality of representations of successful decoding steps have not been assembled.

12. Apparatus for detecting and reading information characters printed on a data field and having contrasting bars extending parallel to each other and separated by spaces, the bars and the spaces organized in frames of equal length each frame containing a bar-space combination defining a character, comprising:

first means for scanning a particular area by a plurality of different line raster scans, the line rasters differing by the direction of their respective lines, the area covered by each of the rasters being larger than the data field;

second means connected to derive a signal train as a result of scanning in representation of contrasts encountered during the scan;

third means connected to the second means to derive from the signal train signal representations of the leading and trailing edges of the bars;

fourth means connected to the third means and continuously assembling a fixed plurality of said representations as they are presented by the third means;

fifth means connected to the fourth means for continuously attempting to decode the content of signal representations as assembled in the fourth means;

sixth means connected to be responsive to successful decoding of a character by operation of the fifth means and further connected for detecting successful or unsuccessful decoding of several fixed pluralities of said representations as sequentially assembled by and in the fourth means;

seventh means connected to assemble sequentially decoded characters, but eliminating the assembly in response to detection of an unsuccessful decoding by operation of the fifth and sixth means; and means connected for temporarily halting the operation of the first means only upon successful assembly of plural decoded characters by the seventh means.

13. Apparatus as in claim 12, and including means separately reponsive to a particular bar pattern at one end of the data field as represented by a particular combination of leading and trailing edges, as being in turn represented in the signal train prior to any characters decoding by operation of the fifth means, for rendering assembly by the seventh means dependent upon accuracy of the particular bar pattern.

14. Apparatus as in claim 12, and including means separately responsive to a particular bar pattern at one end of the data field as represented by a particular combination of leading and trailing edges, as being in turn represented in the signal train subsequent to any character decoding by operation of the fifth means; absence of said bar pattern causing said seventh means to eliminated any assembled decoded characters.

15. Apparatus as in claim 12 and including means separately responsive to signals in the signal train representing particular bar pattern at beginning and end of the data field for rendering the assembly of decoded characters by the seventh means contingent upon detection of said bar patterns respectively ahead of and subsequent to successful decodings by the fifth means.

* * * * *